July 28, 1925.
T. BROWN
LISTER PLOW AND PLANTER
Filed July 8, 1919
1,547,784
2 Sheets-Sheet 2
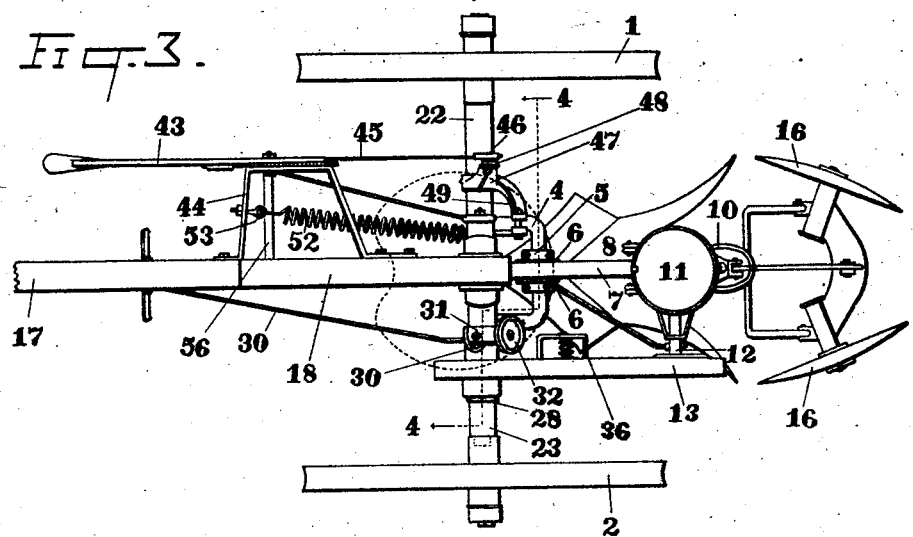
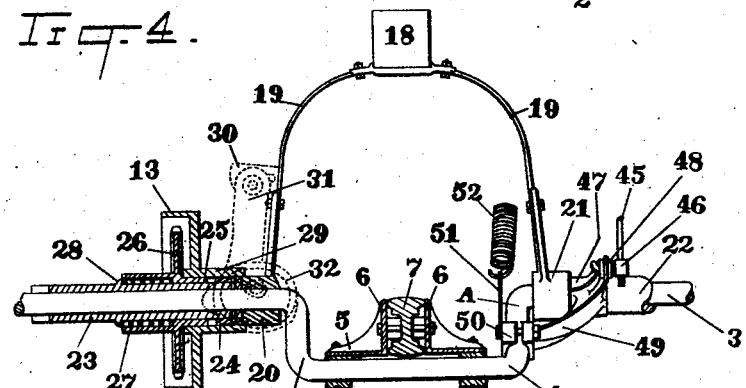
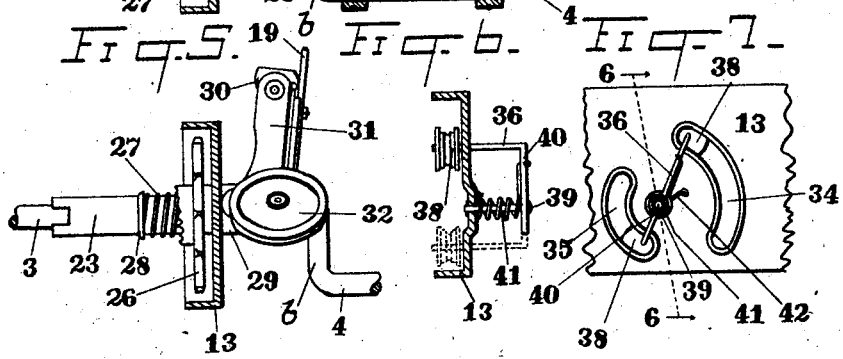

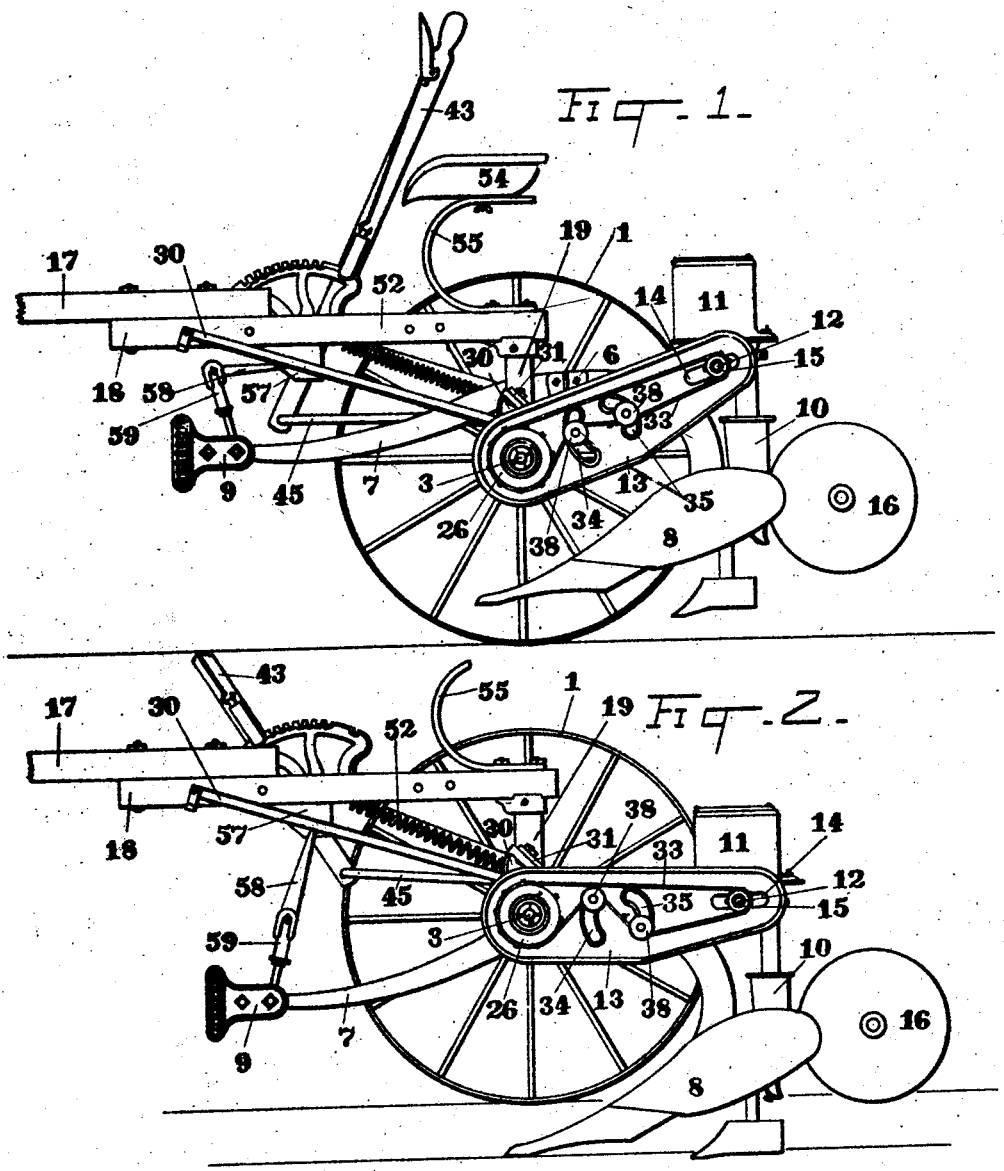

Patented July 28, 1925.

1,547,784

UNITED STATES PATENT OFFICE.

THEOPHILUS BROWN, OF MOLINE, ILLINOIS, ASSIGNOR TO DEERE & COMPANY, OF MOLINE, ILLINOIS, A CORPORATION OF ILLINOIS.

LISTER PLOW AND PLANTER.

Application filed July 8, 1919. Serial No. 309,453.

*To all whom it may concern:*

Be it known that I, THEOPHILUS BROWN, a citizen of the United States, residing at Moline, in the county of Rock Island and State of Illinois, have invented certain new and useful Improvements in Lister Plows and Planters, of which the following is a specification, reference being had therein to the accompanying drawing.

My invention relates to that type of agricultural machinery in which plows and planters are combined for co-operation, and the object of my invention is to provide an effective and positive method of automatically stopping the operation of the planting mechanism when the plow is raised.

A further object of my invention is to provide an automatically operating means for preventing slack in the chain by which the planter mechanism is operated.

Referring to the drawings in which similar numerals indicate identical parts—

Figure 1 is a side elevation of a machine embodying my invention with the plow and planter raised out of operation.

Figure 2 is a similar view of Figure 1 with the plow and planter in operative position.

Figure 3 is a plan view of Figure 1, but with the rear wheel removed.

Figure 4 is a detail section on the line 4—4 of Figure 3.

Figure 5 is a detail of the shifting lever and adjacent parts.

Figure 6 is a detail section on the line 6—6 of Figure 7, and

Figure 7 is a detail side view of the chain tightener.

Supporting wheels 1 and 2 are loosely mounted on opposite ends of an axle having its central portion formed into a bail 4. The bail 4 is journaled in a bearing 5, the latter having upstanding arms 6 between which is rigidly secured a plow beam 7 on the rear of which is mounted a lister plow 8. A draft device 9 is suitably secured to the forward end of the beam 7. On the rear of the beam 7 I rigidly mount a seeding mechanism, of a well known type, having a delivery spout 10 through which seed is dropped in the furrow from the hopper 11.

The mechanism within the hopper is operated by means of a shaft 12, which extends into a housing 13 through a slot 14, and has secured on its outer end a sprocket 15. Covering disks 16 are mounted on the rear of the plow beam.

A draft pole 17 is secured preferably to a stub tongue 18 which is mounted on spring supports 19, the latter being secured to collars 20 and 21 mounted respectively on the axle 3 on opposite sides of the bail 4. A sleeve 22 is interposed on the axle 3, between the hub of the wheel 1 and the collar 21. A sleeve 23 is on the shaft 3 between the collar 20 and the hub of the wheel 2, the outer end of the sleeve 23 forms part of an ordinary claw clutch the second part of which is connected to the hub of the wheel 2, as shown in dotted lines in Figure 3, the clutch being in constant engagement.

On the inner end of the sleeve 23 is rigidly secured a collar 24 forming one member of a common type of clutch, the second member of which is the inner end of the hub 25 of a sprocket 26. The outer end of the hub 25 is enlarged in diameter and bored to accommodate a coil spring 27 which exerts its tension between a flange 28 on the sleeve 23 and the sprocket 26. The hub 25 and the bearing 29 fully cover the clutch parts previously described, whether operated or not, excluding dust and prolonging their efficiency. The housing 13 covers the sprocket 26 and is provided with a bearing 29 in which the collar 24 and attached sleeve is free to rotate. A sprocket chain 33 extends from the sprocket 15 around the sprocket 26 and conveys power from the supporting wheel 2 to operate the planting mechanism. Constant use and consequent wear cause such chains to become slack, and to overcome this and keep the chain taut at all times I provide a device mounted on the closed side of the housing 13 and operating through slots 34 and 35 therein. This device comprises a yoke or U-shaped member 36 extending through the slots 34 and 35 respectively and having mounted on each arm a pulley 38. The member 36 is pivotally secured on the housing 13 by a bolt 39 which passes through the crosshead 40 of the member 36 and through the side of the housing 13 and is secured therein preferably by a cotter or nut.

Surrounding the bolt 39 is a coiled spring 41 one end of which engages with a stud 42 on the housing 13 and its opposite end engages with the cross head 40, consequently the tension of the spring 41 tends to rock the member 36 and hold the pulleys 38 with resilient pressure against the chain 33, the latter passing over one pulley and under the other.

On the collar 20 is an upwardly extending bracket arm 30 on the upper portion of which is pivotally supported an arm 31 projecting downwardly and having its lower end free and extending into contact with the closed side of the housing 13. Intermediate the ends of the arm 31, and projecting beyond the inner side thereof, I mount a friction roller 32. A brace rod 30' is secured to the arm 30 and forwardly to the stub tongue.

To raise the plow and planting mechanism I employ a lever 43 which is pivotally mounted intermediate its ends on a bracket 44 extending laterally from the stub tongue 18. The lever 43 is provided with the usual latch to engage with a segmental rack secured on the bracket 44. Pivotally connected to the lower end of the lever 43 is a rod 45 extending rearward to threaded engagement with a sleeve 46, the latter being provided with a hook 47 which is adapted to engage with a suitable opening in the end of an arm 48 which extends upwardly from the sleeve 22 and is preferably integral therewith. Preferably integral with the sleeve 22 is an arm 49 which extends rearward and inward toward the adjacent side A of the bail 4 to which it is rigidly clamped by bolts which extend through the arm 49, on opposite sides of the adjacent side of the bail 4, and through an opposite strap 50, and are securely held in place by suitable nuts. The upper end of the strap 50 is extended and has a link 51 pivotally secured thereto to which is connected one end of a relief spring 52 having its opposite end engaged with a hook 53 on the bracket 44. A seat 54 for the operator is mounted on a spring support 55 rigidly secured on the stub tongue 18.

From the mechanism heretofore described it will be seen that when the lever 43 is rocked rearwardly on its pivot the bail 4 will be swung upwardly by the power of the lever transmitted thereto through the rod 45 and the arm 48 assisted by the tension of the spring 52. As the bail 4 raises the side b thereof contacts with the friction roller 32 causing the arm 31 to swing toward the housing 13, and as it is in continuous contact with the latter the housing is moved laterally and the clutch formed on the collar 24, and the inner end of the sprocket 26, is separated and the planting mechanism ceases to operate simultaneously with the plow which is raised from the ground by the rise of the bail 4.

As the planting mechanism is mounted on the plow beam 7 it rises with the plow and at the same time rocks the housing 13 carrying the rear end thereof upwardly, it is apparent that the movement of the bail 4 is concentric with the axis of the axle with which the bail 4 is preferably integral, and as the seeding device is rigidly mounted on the beam, which is raised and lowered substantially parallel with the ground, the shaft 12 of the seeding mechanism moves in an arc eccentric to the axis of the axle and the distance between the sprockets 26 and 15 will vary accordingly as the plow is raised or lowered. This increase in distance between the sprockets 26 and 15 increases the pressure of the chain 33 on the pulleys 38 and moves them in opposite directions to the position shown in Figure 1, the arms 37, on which the pulleys are mounted, moving freely in the slots 34 and 25 respectively.

Rocking the lever forwardly reverses the operation just described and the plow and planter are lowered to operative position, as shown in Figure 2, and it will be seen that whether the plow and planter mechanism are raised or lowered the tension of the coil spring 41 at all times prevents any slack in the chain 33. A shaft 56 is rockably supported on the bracket 44 and a bearing 57 on the under side of the stub tongue 18. The shaft 56 is the pivotal point of the lever 43 and to the shaft 56 the lever 43 is rigidly attached. At right angles to the shaft 56, and preferably integral therewith, is an arm 58 pivotally connected at its lower end, to a link 59 which is pivotally connected to the forward end of the plow beam 7. By this lever construction when the lever 43 is rocked the forward end of the beam 7 is raised or lowered simultaneously with the similar movement of the rear thereof carrying the plow body 8 and the planting mechanism, the movement of the plow being in parallelism with the ground, and as the hopper 11 is rigidly mounted on the plow and a straight inflexible tube is employed to deliver seed to the furrow, any interruption in the feed of grain to the furrow is avoided, a fault common in machines of this type having a movable hopper and a sectional or flexible delivery spout.

My device is simple and inexpensive in construction and instantly responsive to the action of the lever 43.

What I claim is—

1. The combination with an axle having a central bail and supporting wheels, a plow beam pivotally supported on the bail, a seeding device mounted on the beam, means operable to rock the bail and raise the plow, gearing connecting one of the wheels with the seeding device, a housing for said gearing, a clutch included in said gearing and located between the housing and the bail, and means between the housing and the bail actuated by raising the plow and operating to move the housing laterally to separate the clutch.

2. The combination with an axle having a central bail and supporting wheels, a plow beam pivotally supported on the bail, a seeding device mounted on the beam, means operable to rock the bail and raise the plow, gearing including a clutch connecting one of the wheels with the seeding device, a housing for said gearing, and a swinging arm pivotally supported between the housing and said bail and in constant contact with said housing and operated by the raising of the plow to move said housing laterally and separate the clutch.

3. The combination with an axle having a central bail and supporting wheels, a plow beam pivotally supported on the bail, a tongue, a support for said tongue on the axle, a seeding device mounted on the beam, gearing including a clutch connecting one of the wheels with the seeding device, a housing for said gearing, a swinging arm pivotally mounted on the tongue support between the housing and the bail and in constant contact with said housing, means to rock the bail and raise the plow, and a roller on said arm with which the bail contacts in the operation of raising the plow, whereby the arm is swung to move said housing laterally to separate the clutch.

THEOPHILUS BROWN.